US012809652B1

(12) United States Patent
Narayanaswamy et al.

(10) Patent No.: US 12,809,652 B1
(45) Date of Patent: Nov. 24, 2026

(54) KNOWLEDGE GRAPH MAPPING FOR ENHANCED SECURITY IN MACHINE LEARNING-BASED SOFTWARE ENVIRONMENT GUIDANCE SYSTEMS

(71) Applicant: INTUIT INC., Mountain View, CA (US)

(72) Inventors: Shivakumara Narayanaswamy, Mountain View, CA (US); Clifford Green, San Diego, CA (US); Ziv Shtacher Heimlich, Hoboken, NJ (US); Anmol Joshi, San Diego, CA (US); Trever Cullen, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/375,402

(22) Filed: Oct. 31, 2025

(51) Int. Cl.
*G06F 9/45* (2006.01)
*G06F 9/451* (2018.01)
*G06F 16/2458* (2019.01)

(52) U.S. Cl.
CPC .......... *G06F 9/453* (2018.02); *G06F 16/2458* (2019.01)

(58) Field of Classification Search
CPC ............. G06F 16/3344; G06F 16/3347; G06F 40/289; G06F 40/30; G06N 5/022
See application file for complete search history.

(56) References Cited

U.S. PATENT DOCUMENTS

| | | | | |
|---|---|---|---|---|
| 12,488,194 | B2 * | 12/2025 | Araki | G06F 40/30 |
| 12,493,803 | B1 * | 12/2025 | Pathak | G06F 40/289 |
| 2025/0013655 | A1 * | 1/2025 | Mohanty | G06F 16/258 |
| 2025/0258849 | A1 * | 8/2025 | Guy | G06F 16/3329 |
| 2025/0292109 | A1 * | 9/2025 | Tripathi | G06F 16/9024 |
| 2025/0342367 | A1 * | 11/2025 | Shama | G06N 5/022 |
| 2026/0057243 | A1 * | 2/2026 | Brown | G06N 3/094 |

* cited by examiner

*Primary Examiner* — Andy Ho
(74) *Attorney, Agent, or Firm* — Patterson + Sheridan, LLP

(57) ABSTRACT

Aspects of the present disclosure relate to systems and protocols for securely generating real-time guidance for users of a software environment using generative machine learning models. In some embodiments, a user location within a software environment is determined based on an identifier such as a web address. Based on the determined user location and a target goal, information may be retrieved from a knowledge graph that maps the software environment. Information from every node along a path from the current location to the target goal may be retrieved and used to generate guidance. Accordingly, accurate and robust guidance may be generated without granting a generative machine learning system access to sensitive information in the user interface. Thus, embodiments disclosed herein represent a significant improvement to the security of artificial intelligence-based guidance systems.

15 Claims, 10 Drawing Sheets

KNOWLEDGE GRAPH MAPPING FOR ENHANCED SECURITY IN MACHINE LEARNING-BASED SOFTWARE ENVIRONMENT GUIDANCE SYSTEMS

INTRODUCTION

Aspects of the present disclosure relate to techniques for securely guiding users through software environments using machine learning-based guidance systems. Specifically, techniques disclosed herein allow for assisting users in navigating a software environment without providing a machine learning-based guidance system access to sensitive information within a user interface.

BACKGROUND

A growing number of people, businesses, and organizations around the world use machine learning technologies to assist users of a software environment in navigating the software environment. For example, a user interface may include a help window into which users can type questions or commands. Based on the input provided by the user, a generative machine learning model may generate an output that is provided to the user (e.g., the output may include an answer to a question asked by the user).

To provide users with more thorough assistance or assistance with more complex problems, existing machine learning-based guidance systems may require access to information contained within the user interface. For example, to assist a user with completing a process (such as navigating from a first location within a software environment to a second location within the software environment), an artificial intelligence agent may scan the user interface and generate an output based on the user interface. The output may include instructions that explain how to reach a target location from a location indicated by the scan.

However, granting machine learning-based guidance systems access to information within a user interface may create security risks. For example, user interfaces may contain sensitive user information. This sensitive information may be compromised if an artificial intelligence system that scans the information is compromised.

Furthermore, machine learning-based systems may struggle to generate accurate and complete guidance even when such systems are granted access to the user interface. For example, due to the complexity of certain software environments, a machine learning model may hallucinate and generate incorrect or otherwise unhelpful guidance. Such hallucinations may occur due to a model's inability to process and contextualize the structure of a software environment.

As a result, there is a need in the art for improved machine learning-based guidance systems for software environments.

BRIEF SUMMARY

Certain embodiments provide a method. The method generally includes: providing an input to a retrieval component, the input comprising: an indication of a user location within a software environment; and an indication of a target goal related to the software environment; retrieving information related to the target goal based on the input and a knowledge graph, wherein: nodes of the knowledge graph represent interactable elements within the software environment; edges of the knowledge graph represent potential actions within the software environment; and the retrieved information includes: information associated with a given node that represents a given interactable element that corresponds to the user location; and information associated with a particular node that represents a particular interactable element that corresponds to the target goal; and generating an output related to the target goal based on the retrieved information.

Some embodiments provide a method. The method generally includes: extracting a first set of information from a first interactable element of a software environment, the first set of information comprising information associated with clickable fields within the first interactable element; simulating, based on the first set of information, a user action to reach a second interactable element within the software environment; extracting a second set of information from the second interactable element, the second set of information comprising information associated with clickable fields within the second interactable element; and generating a knowledge graph based on the first set of information and the second set of information, wherein the knowledge graph comprises: nodes that represent interactable elements within the software environment; and edges that represent potential user actions within the software environment.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
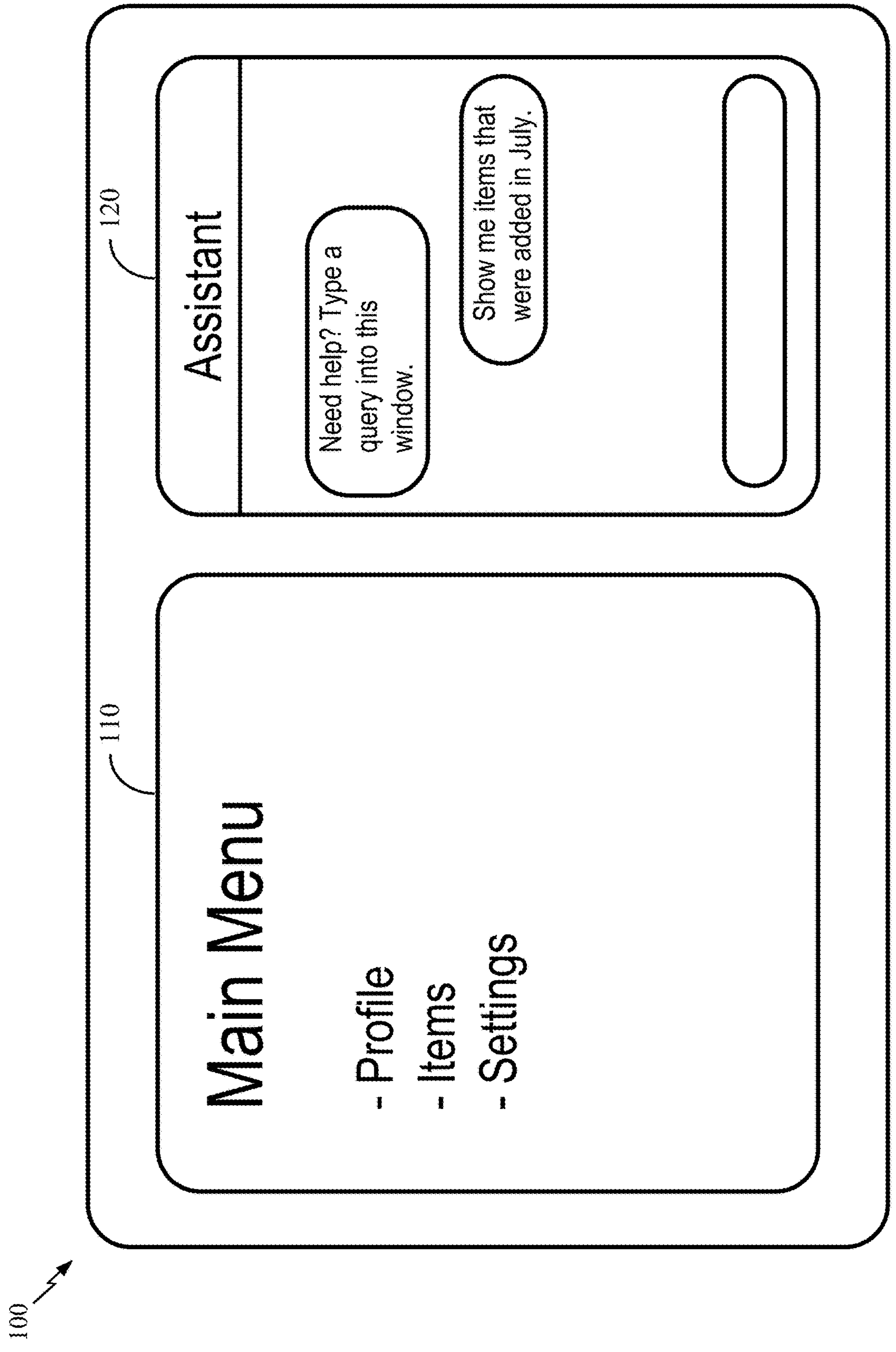
FIG. 1A depicts an example of a user interface according to embodiments disclosed herein.

Aspects of the present disclosure provide apparatuses, methods, processing systems, and computer-readable mediums for securely guiding users through a software environment.

According to some embodiments, information is retrieved based on an indication of a target goal (e.g., a user input specifying the target goal) and an indication of a user's location within a software environment (e.g., the web address of a page currently displayed to the user). The information may be retrieved from a knowledge graph that maps the various interactable elements (e.g., pages and fields within pages) of the software environment. Nodes of the knowledge graph may represent interactable elements, and edges between nodes may represent the action (e.g., a click and/or other input) required to navigate from one node to another. In a particular example, the retrieved information may include information related to the node that represents the user's current location, information related to the node that represents a location/state indicated in the target goal, and information related to each node along a path (e.g., the shortest path) between the user's current location/state and the target goal/location. Based on the retrieved information, outputs may be generated (e.g., by a generative machine learning model) that guide the user to achieve the target goal.

In some embodiments, the knowledge graph is generated by navigating the software environment and extracting information from the software environment. For example, a machine learning system may use techniques such as computer vision to identify clickable fields within the software environment and simulate clicks to navigate through the environment. At each interactable element (e.g., page) within the software environment, the extraction system may extract information. This extracted information may be used to populate the knowledge graph. For example, the node for a first page within the software environment may include information associated with that page. Another node may comprise information associated with a second page that is reached by clicking on an element within the first page. An edge between the first and second nodes may indicate that the second page is reached by clicking on the element within the first page.

Embodiments of the present disclosure provide numerous technical and practical effects and benefits. For example, unlike prior solutions, techniques disclosed herein enable machine learning-based guidance systems to generate accurate and complete guidance, even for complex tasks and software environments. Because the knowledge graphs disclosed herein provide such guidance systems with a complete set of context, the performance of machine learning-based guidance systems is greatly improved.

Furthermore, embodiments disclosed herein allow for generating the guidance without providing a guidance system access to any sensitive user information, thereby overcoming a technical problem relating to data privacy in prior techniques. For example, the guidance may be generated based on an indication of the user's location within the software environment (e.g., the web address or other locator of the user's location) and an indication of a target goal (e.g., a user query). Because the knowledge graph contains a comprehensive mapping of the software environment, the guidance systems disclosed herein may not require access to other user information, such as information contained within the user interface. As a result, sensitive user information may remain secure even if the guidance system is compromised.

Example User Interface

FIG. 1A depicts an example of a user interface according to certain embodiments.

As shown in FIG. 1A, the user interface 100 includes a main window 110 through which a user views a software environment. The software environment may be, for example, a website. The main window 110 may display pages of the website as the user navigates the website. The software environment may be a software environment other than a website, such as a software application and/or the like. In FIG. 1A, the main window 110 is displaying the main menu of the software environment. The main menu in this example software environment includes clickable fields named "profile," "items," and "settings."

The user interface 100 also includes an assistant window 120. The assistant window 120 may present the user with guidance for navigating the software environment and performing tasks. The assistant window 120 shown in FIG. 1A includes a field into which users can type queries. The assistant window 120 also includes a dialog box instructing the user to type a query into the field if the user needs help. As shown in FIG. 1A, the user typed the query "show me items that were added in July" into the field.

As shown in FIG. 1A, a response to the user query has been generated and displayed in the assistant window 120. The response comprises instructions to click on the "items" field in the main menu. The response also includes an image depicting the main menu with the "items" field highlighted. The response thus describes the first action that the user should perform in order to view items that were added in July.

The response may be generated based on a knowledge graph that comprises a mapping the software environment. As described in further detail below with respect to FIG. 2, nodes of the knowledge graph may represent interactable elements such as pages and clickable fields within the pages. Edges of the knowledge graph may represent actions performed to reach a second node from a first node. In the example depicted in FIG. 1B, a first node of the knowledge graph may represent the main menu. A second node of the knowledge graph may represent the "profile" field within the main menu. The profile page may be accessed by clicking on the "profile" field. Thus, the first node and the second node may be connected by an edge that indicates a click. Each node may be associated with information related to the interactable element represented by the node. For example, a node may contain an image of the interactable element (e.g., a screenshot of a page), text extracted from the interactable element, a summary of the interactable element that is generated by a machine learning model, an embedding representation of an interactable element, an embedding representation of the summary of the interactable element, metadata associated with the interactable element, and/or the like. As described in further detail below, the knowledge graph may be generated by a system that is configured to "crawl" the software environment and extract information.

Generation of the response may be further based on data that indicates the location of the user within the software environment. For example, data that indicates the location of the user within the software environment may include the web address of the page that the user is viewing through the main window 110, metadata associated with the page that the user is viewing through the main window 110, and/or the like. The data that indicates the location of the user within the software environment may be used to determine the user's location without accessing any information displayed within the main window 110. For instance, the user may navigate to a page that includes a form, and the page may be displayed in the main window 110. The user may populate the form with sensitive information. However, based on the web address of the page, the user's location may be determined. Thus, the guidance may be generated without granting a guidance system access to any sensitive user data entered into the page.

Figure 1B:
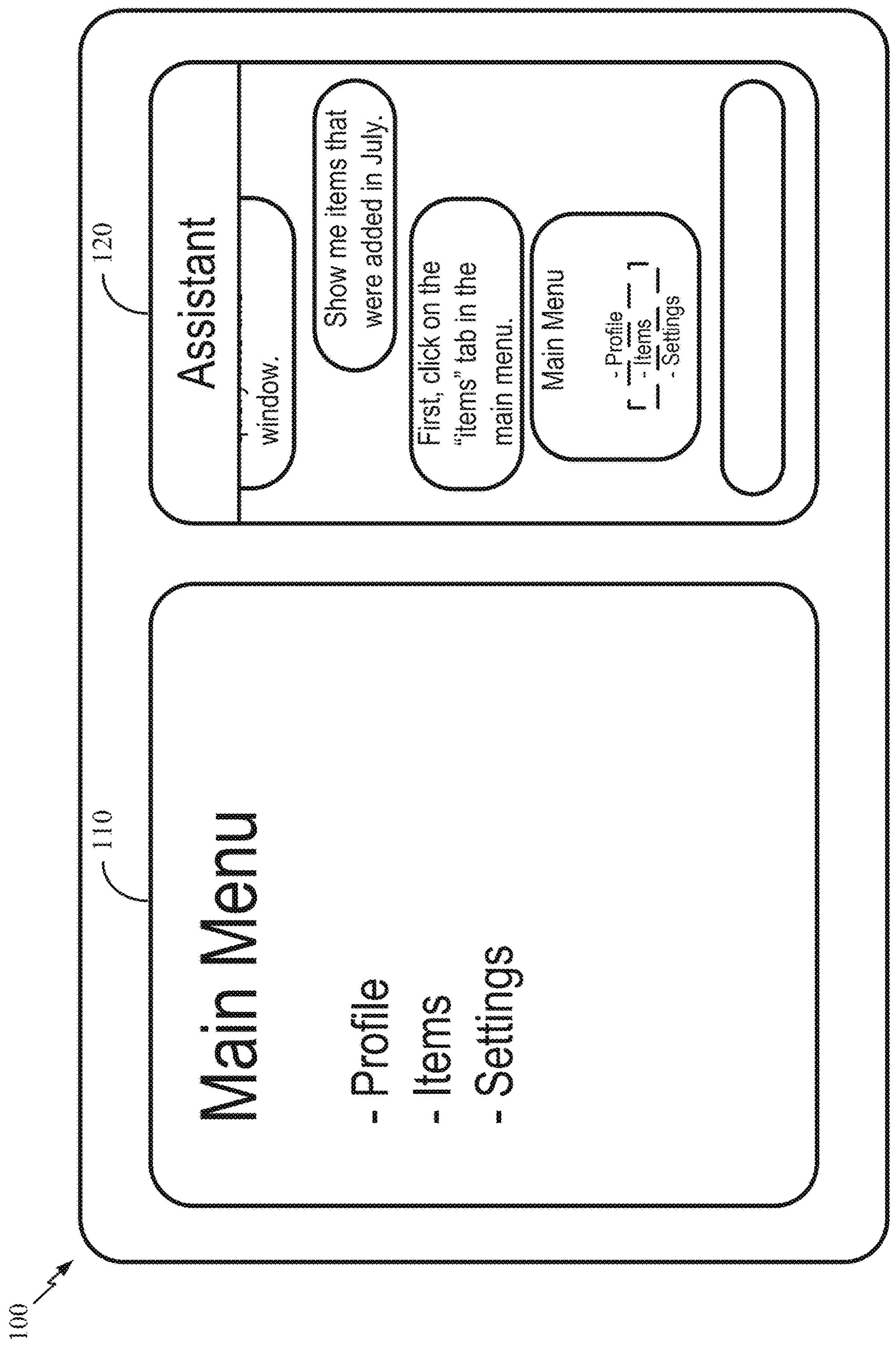
FIG. 1B depicts an additional example of a user interface according to embodiments disclosed herein.

The guidance displayed in FIG. 1B may have been generated based on the web address of the main menu (e.g., the web address of the page displayed in the main window 110 is the web address of the main menu, since the main menu is being displayed in the main window 110 in FIG. 1B). Based on this web address, it may be determined that the user is currently on the main menu of the software environment. This determination may be made without accessing the main window 110. In other words, it is not necessary to scan the main window 110 to determine that the user is on the main menu, since this determination is made based on the web address.

As described in further detail below, the guidance may be generated based on providing an input to a system comprising one or more machine learning models (e.g., an agentic artificial intelligence system). For example, a language processing machine learning model such as a large language model (LLM) may be used to generate the guidance. The system may generate the guidance based on the information that indicates the location of the user, information contained within the knowledge graph, the user query, and/or the like.

The data from the knowledge graph that is used to generate the guidance may be selected based on a path from the user's current location within the software environment and a location associated with a user goal. In some embodiments, the shortest path between the current location and the location associated with the goal is chosen. As an example, a user may have a goal of adjusting the text size for the software environment. Achieving this goal may involve navigating from the main menu to the settings page, then navigating from the settings page to a display settings page. Based on this, the node that represents the main menu, a node that represents the settings page, and a node that represents the display setting page may all be selected. Also, the edges between the nodes may be selected. The guidance may then be generated based on the information contained in the selected nodes and edges.

The nodes and edges may be selected based on the user query. For example, a machine learning model may generate an output based on the user query that indicates a node associated with a target location/goal. As an example, based on a user query that asks to adjust the text size, a machine learning model may generate an output that indicates that the display settings page is related to the target goal. The web address of the user's current location may indicate the user's current location within the software environment. Then, the node that represents the user's current location, the node that represents the display settings page, and every intermediate node along the shortest path between the user's location and the display settings page may be selected. If the user's location is the main menu, the only intermediate node will be the settings page. The guidance may be generated based on the information that is associated with the selected nodes.

Figure 1C:
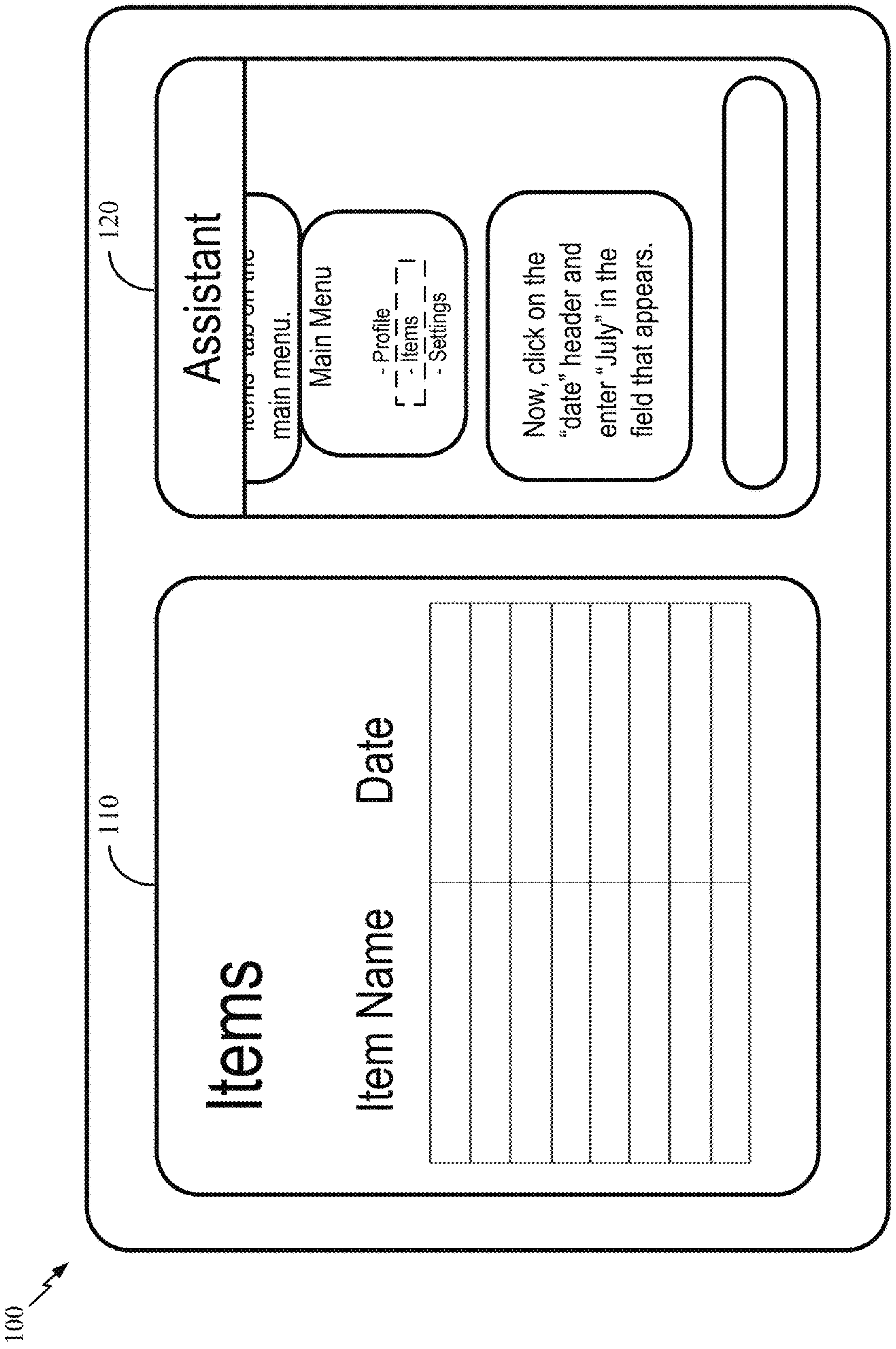
FIG. 1C depicts an additional example of a user interface according to embodiments disclosed herein.
Figure 1D:
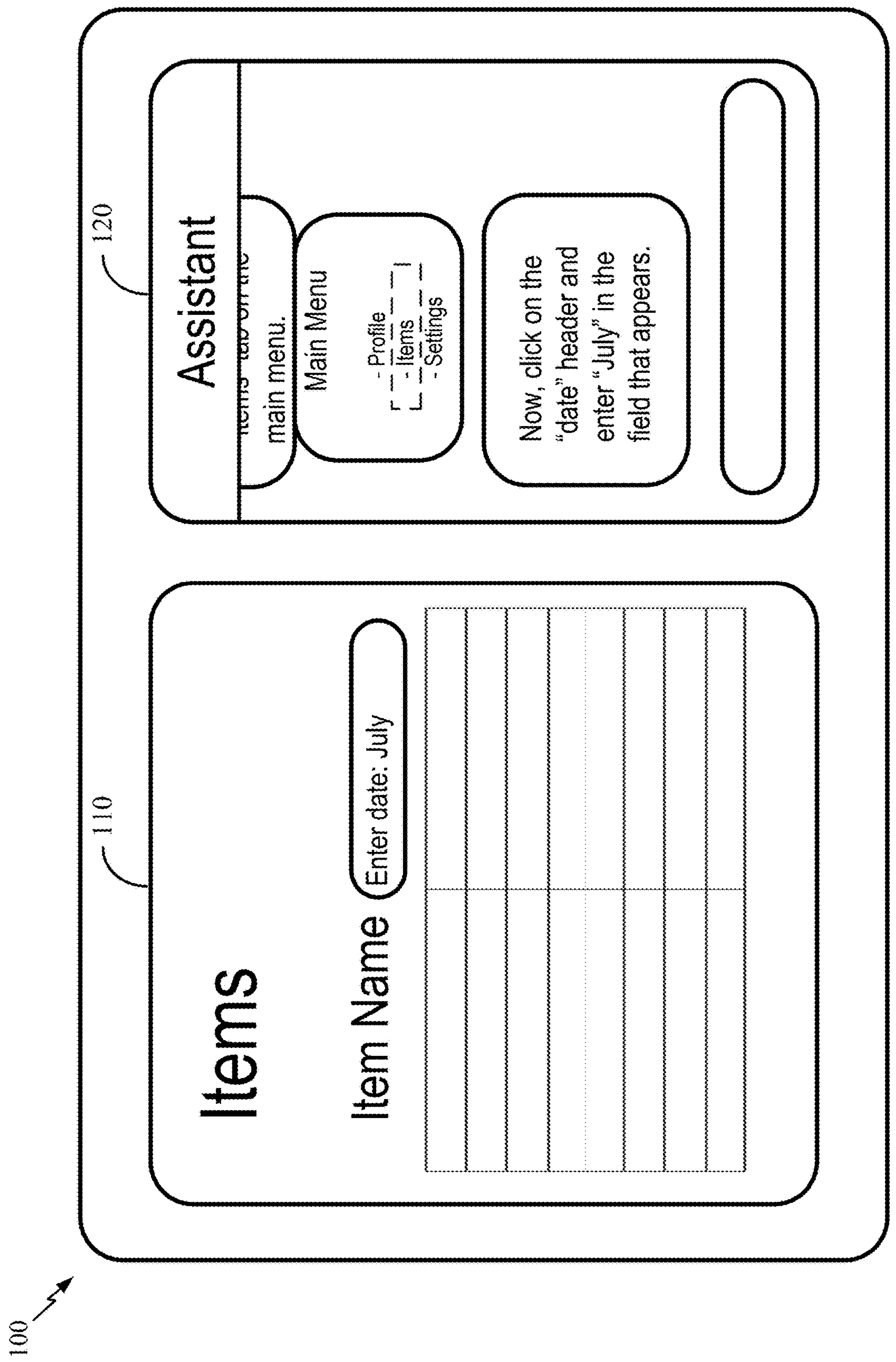
FIG. 1D depicts an additional example of a user interface according to embodiments disclosed herein.

In FIG. 1C, the user that previously requested to view all items added in July has clicked on the "items" field and navigated to the items menu. Based on this action, the items menu is now displayed in the main window 110 and further guidance is generated. The further guidance comprises instructions to click on the "date" header and enter "July" in the field that appears. This additional guidance may be generated based on the web address changing from the web address of the main menu to the web address of the items page. In FIG. 1D, the user has clicked on the "date" header and entered "July" into the field that appeared based on the click. Based on this, the user may be presented with a list of the names of all items added in July along with the exact dates when the items were added.

Example Knowledge Graph

Figure 2:
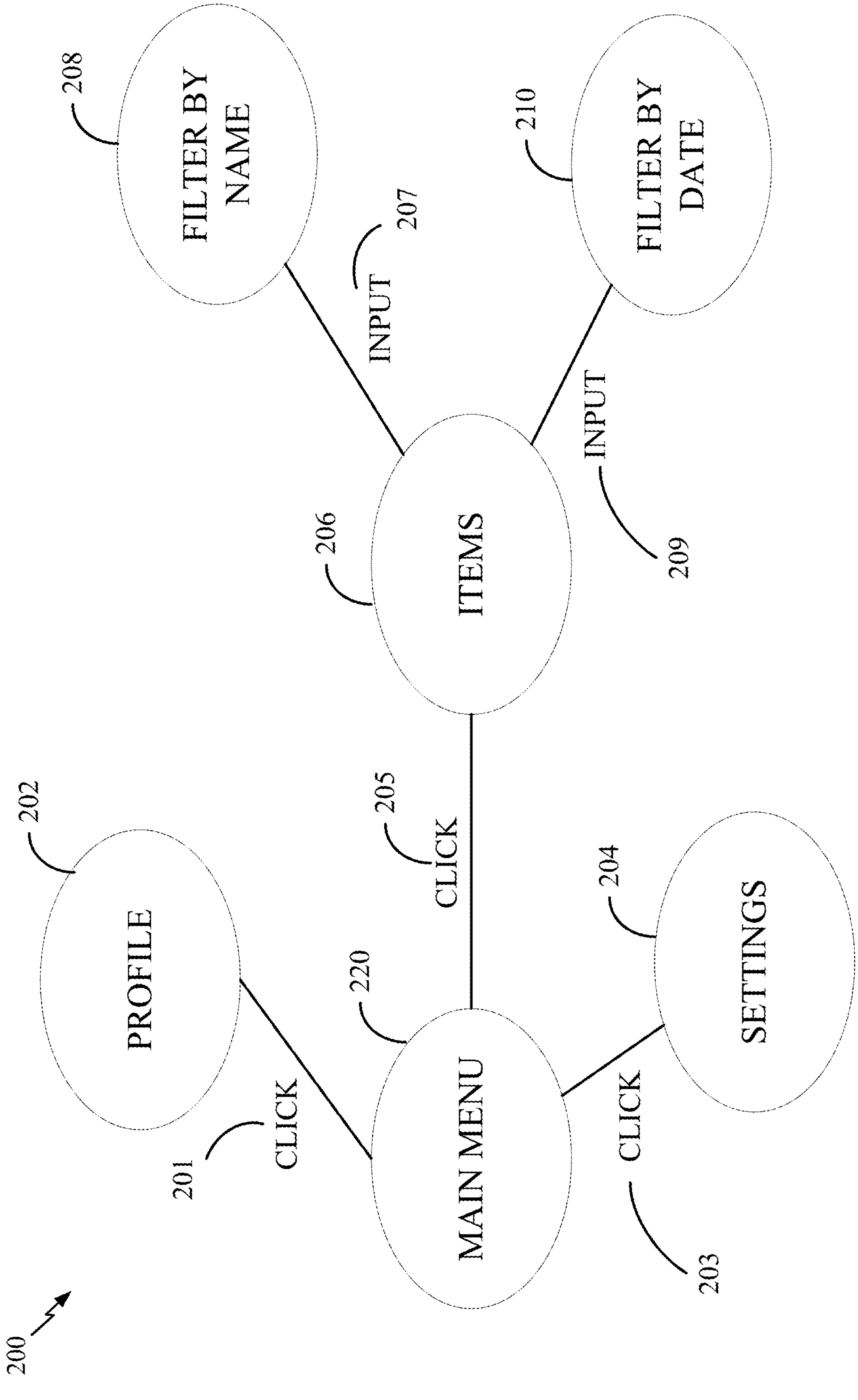
FIG. 2 depicts an example of a knowledge graph according to embodiments disclosed herein.

FIG. 2 depicts an example of a knowledge graph 200 according to certain embodiments. The knowledge graph 200 depicted in FIG. 2 represents the software environment described with respect to FIG. 1A-D.

As shown in FIG. 2, each node of the knowledge graph represents different interactable elements of the software environment. Node 220 represents the main menu, node 202 represents the profile menu, node 204 represents the settings menu, node 206 represents the items menu, node 208 represents the action of filtering by name, and node 210 represents the action of filtering by date. Nodes 202, 204, and 206 can be reached from node 220 by clicks. Edges may represent potential user actions (e.g., clicks or input entries) that may be performed to reach a different node. For example, when on the main menu, clicking on the profile field navigates to the profile menu. As a result, an edge 201 between the main menu node 220 and the profile node 202 indicates a click. Also, when on the main menu, clicking on the settings field navigates to the settings menu. As a result, an edge 203 between the main menu node 220 and the settings node 204 indicates a click. Similarly, when on the main menu, clicking on the items field navigates to the items menu. As a result, an edge 205 between the main menu node 220 and the items node 206 indicates a click.

When on the items page, filtering by name and filtering by date are two actions that each require an input (e.g., typing the name of an item or selecting a date range) other than just a click. As a result, the edge 207 between the items node 206 and the filter by name node 208 indicates an input is required. Similarly, the edge 209 between the items node 206 and the filter by date node 210 indicates an input is required.

Each node may be associated with information related to the interactable element represented by the node. For example, node 206 may be associated with information related to the items page and node 208 may be associated with information related to filtering the items page by name. The information associated with a node may include an image of the interactable element (e.g., a screenshot of a page), text extracted from the interactable element, a summary of the interactable element that is generated by a machine learning model, an embedding representation of an interactable element, an embedding representation of the summary of the interactable element, metadata associated with the interactable element, and/or any other type of information that may be used to generate guidance and/or locate identify nodes based on user queries. For example, the information associated with node 206 may include an embedding representation of a summary of the items page. An embedding representation of a user query requesting to view all items may be generated and compared to embedding representations of summaries associated with various nodes. Based on the comparison, node 206 may be identified. The information associated with node 206 may then be used to generate guidance that guides the user to the item page.

Nodes may be selected based on a path between the target node and the node that represents the current location of a user. In an example, the current location of the user within a software environment may be known based on information such as the web address. The web address may indicate that the user is currently viewing the settings page, represented by node 204. The user may submit a query requesting to view all items containing the word "blue." Based on this query, the filter by name node 208 may be identified (e.g., based on an embedding comparison involving the query and a summary of the node 208). Thus, every node along the shortest path between the settings node 204 and the filter by name node 208 may be selected. This includes the settings node 204 and the filter by name node 208, as well as the main menu node 220 and the items node 206. The guidance may then be generated based on the information associated with the selected nodes (and the edges between the selected nodes). For example, the guidance may include instructions to enter an input comprising the word "blue" based on edge 207 specifying that an input other than a click is required.

The knowledge graph 200 may have been generated using a system that is configured to "crawl" the software environment and extract information, as described in further detail below with respect to FIG. 3.

Example of Computing Components Related to Generating Knowledge Graphs

Figure 3:
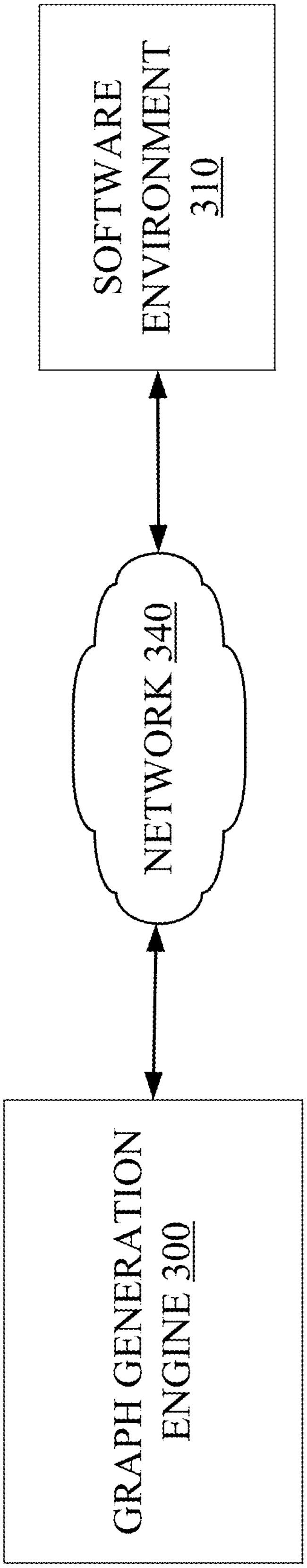
FIG. 3 depicts an example of computing components related to generating a knowledge graph according to embodiments disclosed herein.

FIG. 3 depicts an example of computing components related to generating knowledge graphs, such as knowledge graph 200 of FIG. 2.

The software environment 310 may be any type of software environment, such as a website or a software application. The software environment 310 may be implemented using one or more processors.

The graph generation engine 300 may be one or more software components implemented using one or more processors. The graph generation engine 300 may be configured to "crawl" the software environment 310 and extract information from the software environment 310. In some embodiments, the graph generation engine 300 comprises an agentic artificial intelligence system with multiple "agents" configured to perform the various tasks associated with the information extraction and crawling. Each agent may comprise a machine learning model configured (e.g., trained and/or prompted) to perform one or more tasks.

In some embodiments, the graph generation engine 300 comprises an extraction component that is configured to extract information from interactable elements (e.g., pages, fields within pages, windows, tables, and/or the like) of the software environment 310. The extraction component may be configured to parse the text within the interactable elements. The extraction component may be configured to capture images (e.g., screenshots) of the interactable elements. The extraction component may also extract metadata from the interactable elements. In some embodiments, the extraction component comprises a machine learning model that is configured to extract information from the interactable elements. For example, the machine learning model may be a computer vision model that is trained and/or otherwise configured to extract information. For example, the computer vision model may be a masked recurrent convolutional neural network (MaskRCNN) that is configured to identify clickable fields within the pages.

Based on the extracted information, user actions may be simulated to navigate the software environment 310. For example, if a clickable field is identified, the field may be "clicked" to navigate to the page that is linked by the field. As another example, field inputs (such as text inputs) may be generated by a machine learning model and used to populate fields. The field inputs may be generated based on the extracted information. Once the field is populated and entered, a subsequent page may be reached. For example, if a field must be populated in order to progress to a subsequent field or page, the machine learning model may generate an input to populate the field, and the subsequent field or page may then be reached. In some embodiments, the field inputs may be selected from a set of sample inputs or randomly generated.

Certain embodiments provide that a summary of the interactable elements may be generated based on the extracted information. For example, a machine learning model, such as an LLM, may be used to generate the summary based on the extracted information. The machine learning model may be trained and/or otherwise configured to generate such summaries.

In some embodiments, embedding representations of the summaries and/or other extracted information may be generated. An embedding generally refers to a vector representation of a text item that represents the item as a vector in n-dimensional space such that similar items are represented by vectors that are close to one another in the n-dimensional space. A machine learning model used to create embeddings may comprise a neural network or other type of machine learning model that learns a representation (embedding) for an item through a training process that trains the neural network based on a data set, such as a plurality of features of a plurality of items. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embedding representations of entities are possible.

The embedding representations may be used to identify nodes based on user queries. For example, a user query may indicate a goal. An embedding representation of the user query may be created and compared to embedding representations of the summaries to identify a node that corresponds to the indicated goal. As an example, if the goal is to reach the main menu, the summary of the main menu may be used to identify the main menu node as a node that corresponds to the goal. All nodes along a path (e.g., the shortest path with the smallest number of nodes) between the user's current location node and the main menu node may then be selected.

The extracted information, the summaries, and/or the embedding representations may be associated with the various nodes of the knowledge graph that represent interactable elements within the software environment 310. For example, information extracted from the main menu of a software environment, a summary of the main menu, and/or the embedding representations of the information and summaries may each be associated with a node that represents the main menu. Thus, if the main menu node is selected, the summary of the main menu and all other information associated with the main menu node may be retrieved. The nodes may then be connected to other nodes using edges that indicate how a second node is reached from a first node. For example, if a page represented by the second node is reached by clicking on a given field within the first node, the edge between the two nodes may indicate that clicking on the given field will result in reaching the second node.

The graph generation engine 300 and the software environment 310 may communicate over a network 340. Network 340 may be any connection over which data may be transmitted. In one example, network 340 is the Internet. In other embodiments, the graph generation engine 300 and the software environment 310 are implemented locally with respect to each other, such as on a computing device.

Figure 4:
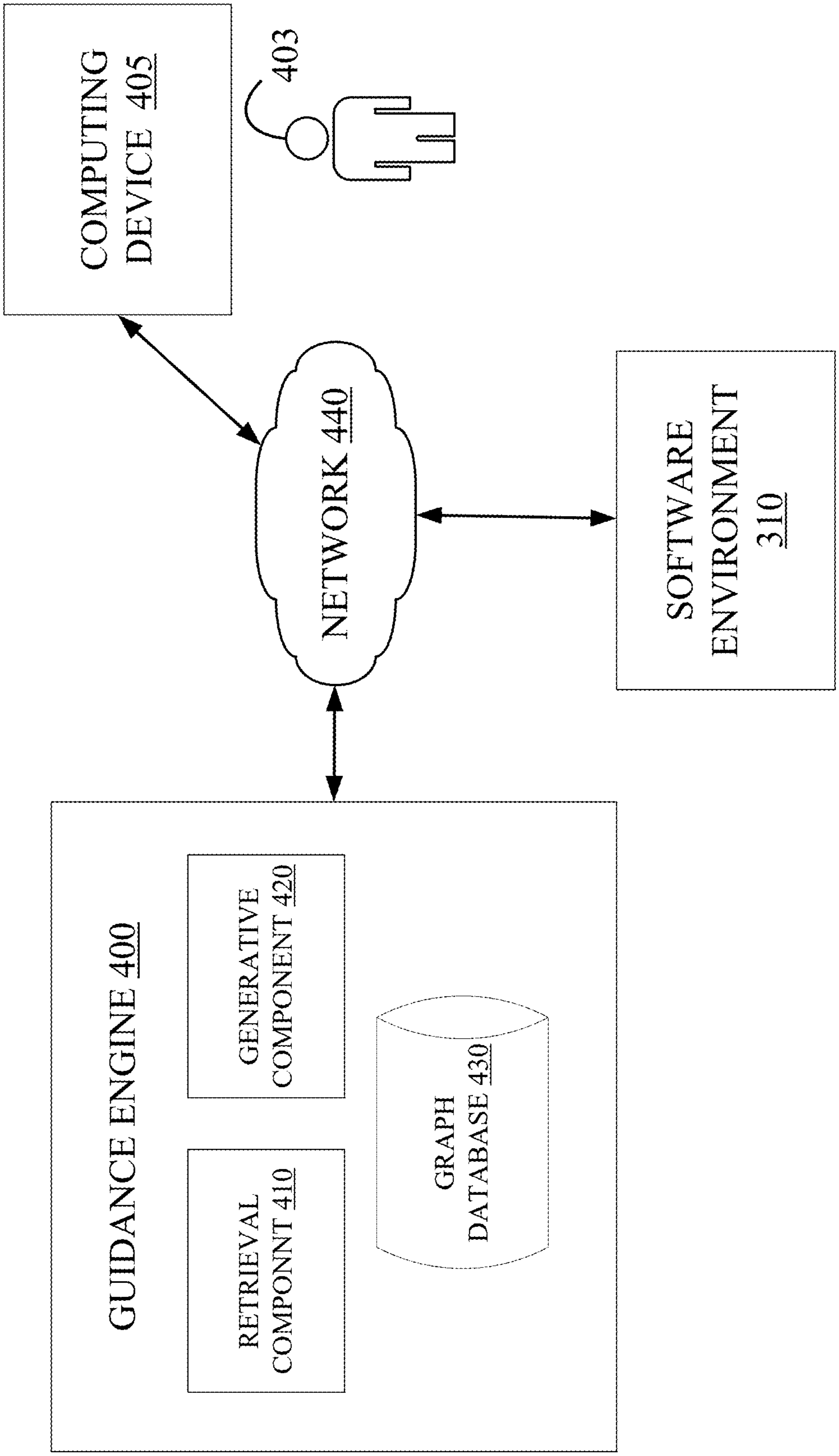
FIG. 4 depicts an example of a computing system configured to guide a user of a software environment according to embodiments disclosed herein.

Example of Computing Components Related to a Computing System Configured to Guide a User of a Software Environment FIG. 4 depicts an example of computing components related to a computing system configured to guide a user of a software environment.

The user 403 may interact with the software environment 310 via a computing device 405. The computing device 405 may be configured to implement a user interface through which interactable elements (e.g., pages) of the software environment 310 are displayed. The user interface may also display guidance that is generated by guidance engine 400.

The guidance engine 400 may comprise a retrieval component 410, a generative component 420, and a graph database 430. The retrieval component 410 may be used to retrieve information from a knowledge graph (e.g., knowledge graph 200 of FIG. 2) stored in the graph database 430.

In an illustrative example, the user 403 may submit a query (e.g., a question or a command) via a user interface of the computing device 405. The retrieval component 410 may comprise an embedding model that is configured to generate an embedding representation of the user query. The retrieval component 410 may then perform semantic similarity comparisons (e.g., using a semantic similarity algorithm such as edit distance or cosine similarity) to compare the embedding representation of the user query to embedding representations of information associated with nodes. For example, an embedding representation of a summary associated with a given node may be compared to the embedding representation of the query. If the semantic similarity exceeds the semantic similarity between the query and other nodes, then the given node may be selected as a node that corresponds to the goal of the query. Based on this, information associated with the given node and all nodes along path between the given node and the user's location may be retrieved from the graph database 430. The user's location may be determined based on an identifier of the user's location, such as the web address of the page/interactable element where the user is located within the software environment 310.

In another example retrieval process, the retrieval component 410 comprises a machine learning model (e.g., a neural network-based model, a tree-based model, and/or the like) that is configured to generate an output indicating a target node based on a user query. For example, the user query may be provided as input to the machine learning model, and the machine learning model may generate an output indicating a given node. Based on this, information associated with the given node and all nodes along path between the given node and the user's location may be retrieved from the graph database 430.

In some embodiments, information is retrieved based on using text-based similarity metrics, such as n-grams (n-grams are generally groups of up to n consecutive words or characters, where n is a positive integer). For instance, the text-based similarity comparison may involve comparing n-grams of prompts using a bilingual evaluation understudy (BLEU) algorithm, a recall-oriented understudy for gisting evaluation (ROUGE) algorithm, an edit distance algorithm, and/or the like. These text-based techniques may be used to determine which node is most similar to the user query. Other similarity determination techniques as known in the art are possible.

The generative component 420 may be used to generate guidance based on the retrieved information. The generative component 420 may comprise a generative machine learning model (e.g., a language processing machine learning model such as an LLM) that is trained and/or otherwise configured to generate guidance based on retrieved information. The guidance may also be generated based on the user's location within the software environment 310. For example, if the user moves from a first page to a second page (as indicated by an identifier such as a web address), updated guidance may be generated to guide the user to a third page. Generated guidance may be transmitted to the computing device 405 via network 440. The query may be transmitted from computing device 405 to guidance engine via network 440.

In an illustrative example, the user 403 may submit a query that includes a request to view an item. The user 403 may be located on the main menu of the software environment 310, as indicated by the web address of the page the user is viewing being the web address for the main menu. Based on the user query and the web address, the retrieval component 410 may retrieve information associated with selected nodes of a knowledge graph from the graph database 430. The selected nodes may include a node associated with a page that allows users to view items, a node associated with the main menu, and every node along a path in the knowledge graph from the main menu node to the item viewing node. The generative component 420 may then generate the guidance in steps. The first step of the guidance generated by the generative component may include guidance that guides the user 403 from the main menu to an intermediate page between the main menu and the item viewing page. It may be determined that the user 403 moved from the main menu to the intermediate page based on the web address changing from the web address of the main menu to the web address of the intermediate page. Then, additional guidance may be generated based on this determination. The additional guidance may guide the user 403 from the intermediate page to the item viewing page. When the web address indicates that the user has reached the item viewing page, specific instructions on how to view the item may be generated.

Machine learning models described herein may be trained using supervised, unsupervised or semi-supervised learning techniques. Supervised learning techniques generally involve providing training inputs to a machine learning model (or one or more layers thereof). The machine learning model processes the training inputs and outputs predictions based on the training inputs. The predictions are compared to known labels associated with the training inputs to determine the accuracy of the machine learning model, and parameters of the machine learning model (e.g., synaptic weights) are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model such as based on validation data and test data, as is known in the art.

The guidance engine 400, the computing device 405, and the software environment 310 may communicate over a network 440. Network 440 may be any connection over which data may be transmitted. In one example, network 440 is the Internet. In other embodiments, the guidance engine 400 and the software environment 310 are implemented locally with respect to each other, such as on the computing device 405.

Example Operations Related to Guiding a User of a Software Environment

Figure 5:
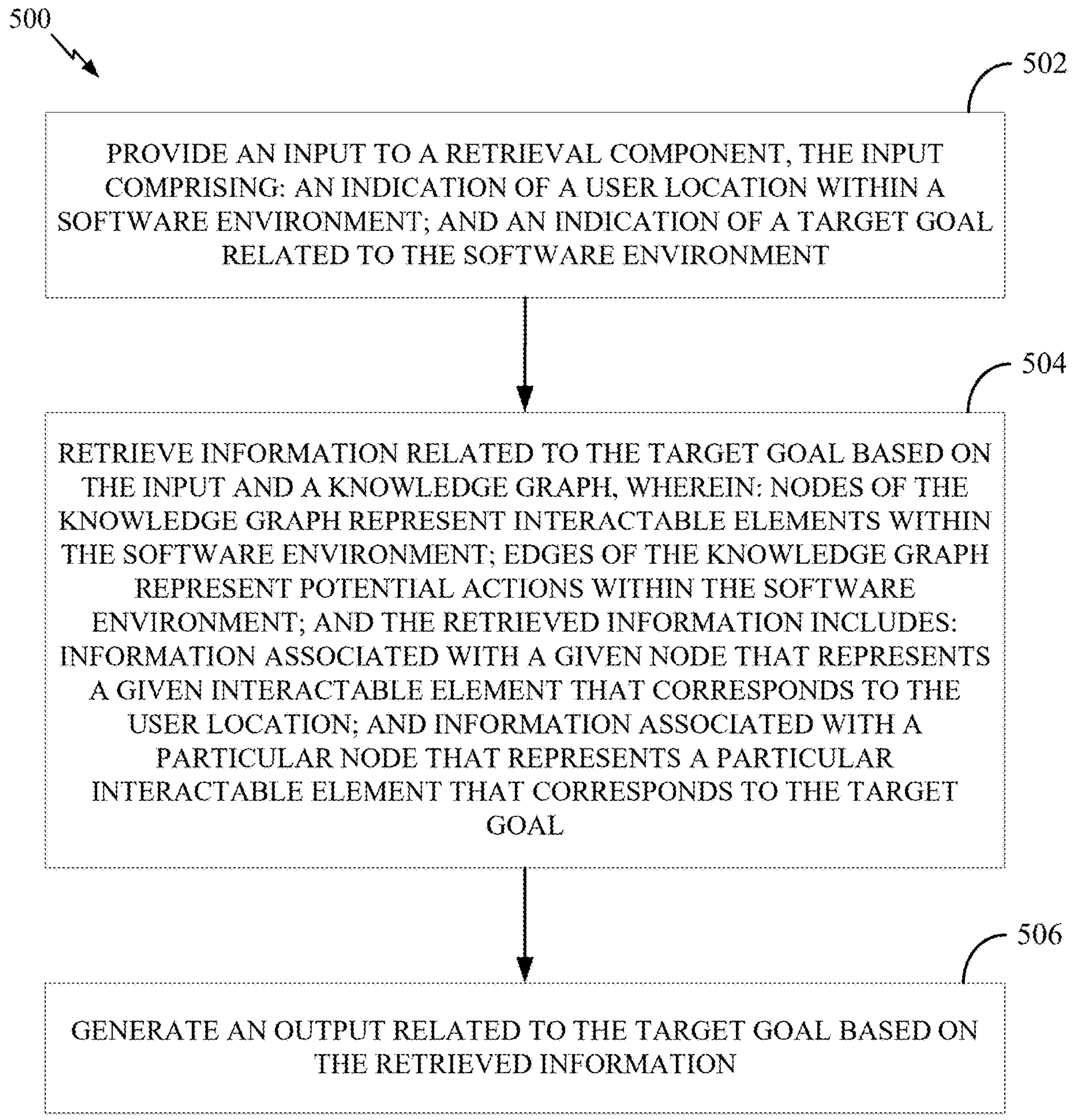
FIG. 5 depicts example operations related to generating a knowledge graph.

FIG. 5 depicts example operations 500 related to guiding a user of a software environment. For example, operations 500 may be performed by one or more of the components described with respect to FIG. 4.

Operations 500 begin at step 502 with providing an input to a retrieval component, the input comprising: an indication of a user location within a software environment; and an indication of a target goal related to the software environment. According to some embodiments, the indication of the target goal comprises a user query including a request to reach the particular interactable element. Certain embodiments provide that the indication of the user location within the software environment comprises a web address.

Operations 500 continue at step 504 with retrieving information related to the target goal based on the input and a knowledge graph, wherein: nodes of the knowledge graph represent interactable elements within the software environment; edges of the knowledge graph represent potential actions within the software environment; and the retrieved information includes: information associated with a given node that represents a given interactable element that corresponds to the user location; and information associated with a particular node that represents a particular interactable element that corresponds to the target goal. Certain embodiments provide that retrieving the information related to the target goal is based generating an embedding representation of the user query and performing a semantic similarity comparison with respect to an embedding representation of the information associated with the particular node. Some embodiments provide that the information associated with the particular node comprises a summary of the particular interactable element generated using a language processing machine learning model. According to certain embodiments, the information associated with the particular node comprises information associated with an edge connected to the particular node. In certain embodiments, the particular interactable element comprises a webpage or a field within a webpage.

Operations 500 continue at step 506 with generating an output related to the target goal based on the retrieved information. In some embodiments, the output comprises instructions that guide a user to the particular interactable element.

Example Operations Related to Generating a Knowledge Graph

Figure 6:
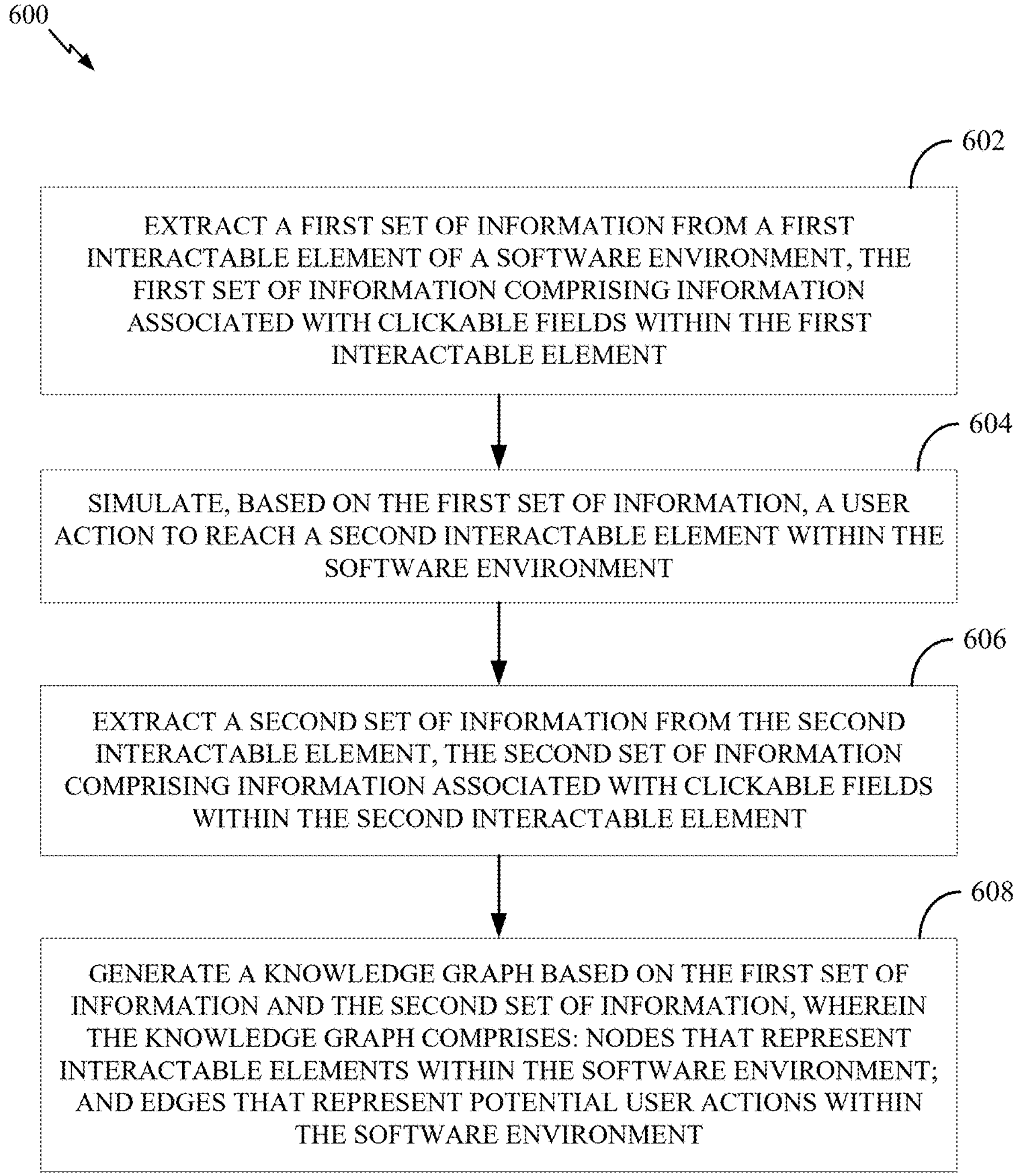
FIG. 6 depicts example operations related to guiding a user of a software environment.

FIG. 6 depicts example operations 600 related to generating a knowledge graph. For example, operations 600 may be performed by one or more of the components described with respect to FIG. 3 to generate a knowledge graph such as knowledge graph 200 of FIG. 2.

Operations 600 begin at step 602 with extracting a first set of information from a first interactable element of a software environment, the first set of information comprising information associated with clickable fields within the first interactable element.

Operations 600 continue at step 604 with simulating, based on the first set of information, a user action to reach a second interactable element within the software environment.

Operations 600 continue at step 606 with extracting a second set of information from the second interactable element, the second set of information comprising information associated with clickable fields within the second interactable element.

Operations 600 continue at step 608 with generating a knowledge graph based on the first set of information and the second set of information, wherein the knowledge graph comprises: nodes that represent interactable elements within the software environment; and edges that represent potential user actions within the software environment. According to some embodiments, an output is generated based on the knowledge graph, the output comprising instructions that explain how to reach an interactable element associated with a given node from an interactable element associated with a particular node. In some embodiments, the output is generated based on a user query indicating a target goal, wherein the target goal involves the interactable element associated with the given node. In certain embodiments, the output is generated based on generating an embedding representation of the user query and performing a semantic similarity comparison with respect to an embedding representation of the information associated with the given node. Certain embodiments provide that the output is generated based on a web address associated with a location of a user within a software environment.

Figure 7:
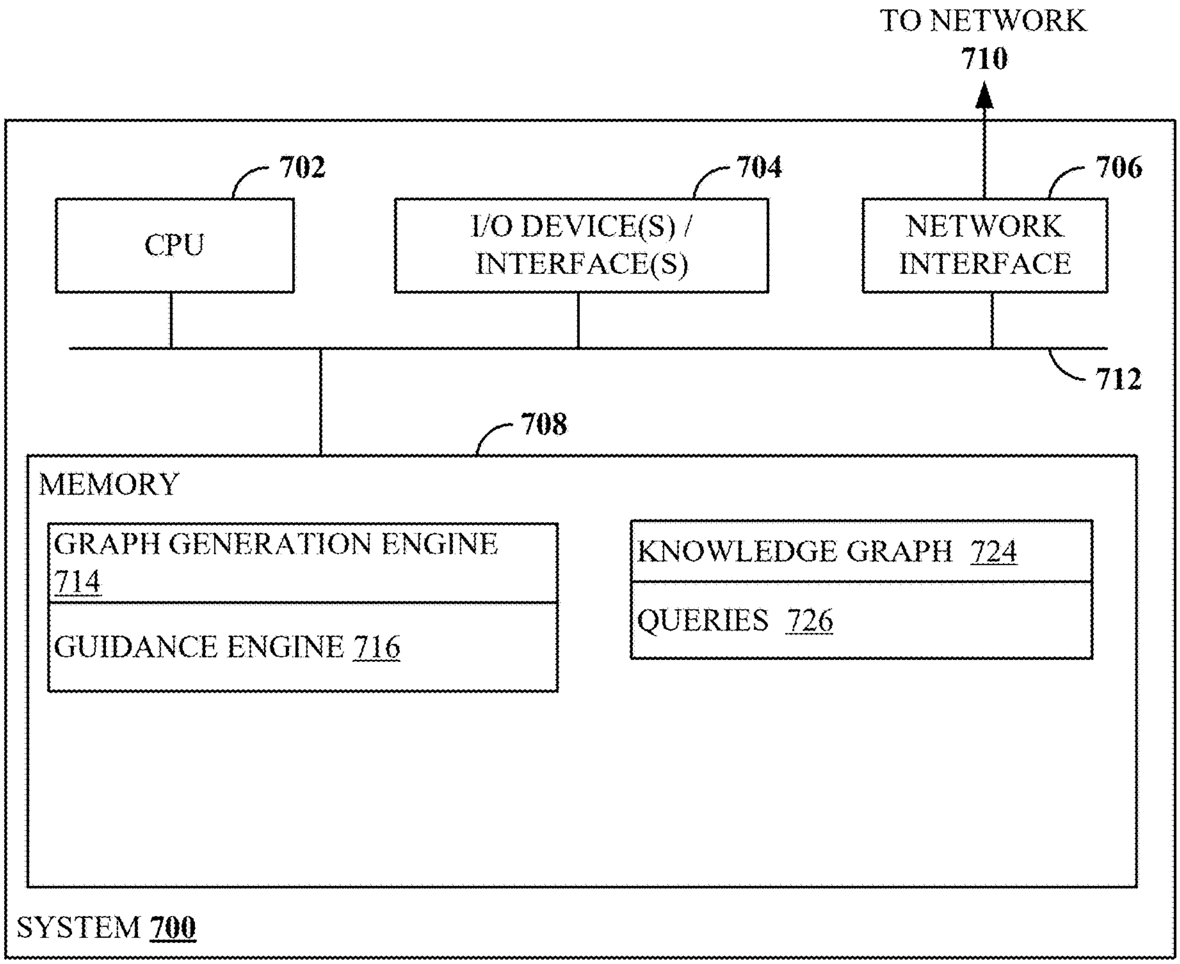
FIG. 7 depicts an example of a processing system according to embodiments disclosed herein.

Example of a Processing System for Implementing Embodiments of the Present Disclosure FIG. 7 illustrates an example system 700 with which embodiments of the present disclosure may be implemented. For example, system 700 may be configured to perform operations 500 of FIG. 5, operations 600 of FIG. 6, and/or to implement one or more components as in FIG. 3 or FIG. 4.

System 700 includes a central processing unit (CPU) 702, one or more I/O device interfaces that may allow for the connection of various I/O devices 704 (e.g., keyboards, displays, mouse devices, pen input, etc.) to the system 700, network interface 706, a memory 708, and an interconnect 712. It is contemplated that one or more components of system 700 may be located remotely and accessed via a network 710. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes graph generation engine 714, which may be representative of graph generation engine 300 of FIG. 3. Memory 708 further comprises guidance engine 716, which may correspond to guidance engine 400 of FIG. 4. Memory 708 further comprises knowledge graph 724 which may correspond to knowledge graph 200 of FIG. 2. Memory 708 further comprises queries 726, which may include queries submitted by users.

It is noted that in some embodiments, system 700 may interact with one or more external components, such as via network 710, in order to retrieve data and/or perform operations.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

providing an input to a retrieval component, the input comprising:

an address of a page that the user is viewing within a software environment, wherein the address is obtained without accessing information contained within the user interface; and an indication of a target goal related to a corresponding page within the software environment;

retrieving information related to the target goal based on the input and a knowledge graph, wherein:

nodes of the knowledge graph represent interactable elements located within the software environment;

edges of the knowledge graph represent actions that are performable within the software environment; and the retrieved information includes:

information associated with a given node that represents a given interactable element that corresponds to the page that the user is viewing within the software environment; and information associated with a particular node that represents a particular interactable element that corresponds to the target goal; and generating an output related to the target goal based on the retrieved information.

2. The method of claim 1, wherein the indication of the target goal comprises a user query including a request to reach the particular interactable element.

3. The method of claim 2, wherein retrieving the information related to the target goal is based on generating an embedding representation of the user query and performing a semantic similarity comparison with respect to an embedding representation of the information associated with the particular node.

4. The method of claim 1, wherein the output comprises instructions that guide a user to the particular interactable element.

5. The method of claim 1, wherein the address of the page that the user is viewing within the software environment comprises a web address.

6. The method of claim 1, wherein the information associated with the particular node comprises a summary of the particular interactable element generated using a language processing machine learning model.

7. The method of claim 1, wherein the information associated with the particular node comprises information associated with an edge connected to the particular node.

8. The method of claim 1, wherein the particular interactable element comprises a webpage or a field within a webpage.

9. A system, comprising:

one or more processors communicatively coupled via a network to a machine learning platform comprising multiple provisioned throughput units and multiple on-demand throughput units, the one or more processors configured to implement a computing environment and a user interface associated with the computing environment; and a memory comprising instructions that, when executed by the one or more processors, cause the system to:

provide an input to a retrieval component, the input comprising:

an address of a page that the user is viewing within a software environment, wherein the address is obtained without accessing information contained within the user interface; and an indication of a target goal related to a corresponding page within the software environment;

retrieve information related to the target goal based on the input and a knowledge graph, wherein:

nodes of the knowledge graph represent interactable elements located within the software environment;

edges of the knowledge graph represent actions that are performable within the software environment; and the retrieved information includes:

information associated with a given node that represents a given interactable element that corresponds to the page that the user is viewing within the software environment; and information associated with a particular node that represents a particular interactable element that corresponds to the target goal; and generate an output related to the target goal based on the retrieved information.

10. The system of claim 9, wherein the indication of the target goal comprises a user query including a request to reach the particular interactable element.

11. The system of claim 10, wherein retrieving the information related to the target goal is based on generating an embedding representation of the user query and performing a semantic similarity comparison with respect to an embedding representation of the information associated with the particular node.

12. The system of claim 9, wherein the output comprises instructions that guide a user to the particular interactable element.

13. The system of claim 9, wherein the address of the page that the user is viewing within the software environment comprises a web address.

14. The system of claim 9, wherein the information associated with the particular node comprises a summary of the particular interactable element generated using a language processing machine learning model.

15. The system of claim 9, wherein the information associated with the particular node comprises information associated with an edge connected to the particular node.

* * * * *